(12) United States Patent
Russell et al.

(10) Patent No.: US 6,954,236 B1
(45) Date of Patent: *Oct. 11, 2005

(54) SILICON-ON-SAPPHIRE DISPLAY WITH WIRELESS INTERCONNECTIONS AND METHOD OF FABRICATING SAME

(75) Inventors: Stephen D. Russell, San Diego, CA (US); Randy L. Shimabukuro, Kapolei, HI (US); Bruce W. Offord, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 45 days.

This patent is subject to a terminal disclaimer.

(21) Appl. No.: 10/911,768

(22) Filed: Jul. 29, 2004

Related U.S. Application Data

(60) Continuation-in-part of application No. 10/614,426, filed on Jul. 7, 2003, which is a continuation-in-part of application No. 09/880,660, filed on Aug. 3, 2001, now Pat. No. 6,617,187, which is a division of application No. 09/047,658, filed on Mar. 25, 1998, now Pat. No. 6,312,968, which is a continuation-in-part of application No. 08/301,170, filed on Sep. 1, 1994, now abandoned, which is a continuation-in-part of application No. 08/105,252, filed on Aug. 4, 1993, now abandoned, which is a continuation-in-part of application No. 08/094,541, filed on Jun. 30, 1993, now Pat. No. 5,300,443.

(51) Int. Cl.$^7$ .......................................... G02F 1/1343

(52) U.S. Cl. ............................................ 349/38

(58) Field of Search ................................ 349/38

(56) References Cited

U.S. PATENT DOCUMENTS

| 4,694,347 A | * | 9/1987 | Ito .............................. 348/794 |
| 6,190,933 B1 | | 2/2001 | Shimabukuro et al. |
| 6,365,936 B1 | | 4/2002 | Shimabukuro et al. |
| 6,521,950 B1 | | 2/2003 | Shimabukuro et al. |

FOREIGN PATENT DOCUMENTS

| WO | WO 99/49503 | 9/1999 |
| WO | WO 99/49510 | 9/1999 |

OTHER PUBLICATIONS

U.S. Appl. No. 10/614,426, Russell et al.*
Kihong Kim, Hyun Yoon, and Kenneth K.O., "On-Chip Wireless Interconnection With Integrated Antennas," IEEE, 2000, pp. 20.3.1-20.3.4.
Mau-Chung Frank Chang, et al., "RF/Wireless Interconnect for Inter- and Intra-Chip Communications," Proceedings of the IEEE, Apr. 2001, pp. 456-466, vol. 89, No. 4.

* cited by examiner

*Primary Examiner*—Robert H. Kim
*Assistant Examiner*—Prasad R. Akkapeddi
(74) *Attorney, Agent, or Firm*—Andrew J. Cameron; Michael A. Kagan; Peter A. Lipovsky

(57) ABSTRACT

A liquid crystal display includes: a) a sapphire substrate; b) a single crystal silicon structure disposed on the sapphire substrate to create a silicon-on-sapphire structure; c) a plurality of liquid crystal capacitors disposed on the silicon-on-sapphire structure; d) integrated self-aligned circuitry formed from the crystal silicon structure, where the circuitry modulates the liquid crystal capacitors in response to an input control signal; and e) a receiver disposed on the silicon-on-sapphire structure for receiving electromagnetic radiation and generating the input control signal responsive to the received electromagnetic radiation.

20 Claims, 9 Drawing Sheets

SILICON-ON-SAPPHIRE DISPLAY WITH WIRELESS INTERCONNECTIONS AND METHOD OF FABRICATING SAME

CROSS-REFERENCE TO RELATED APPLICATIONS

This application is a continuation-in-part of U.S. patent application Ser. No. 10/614,426 (Navy Case No. 84,892) filed Jul. 7, 2003, entitled "Silicon-On-Sapphire Display Apparatus And Method of Fabricating Same," which is a continuation-in-part of U.S. patent application Ser. No. 09/880,660 (Navy Case No. 83,222) filed Aug. 3, 2001, U.S. Pat. No. 6,617,187 entitled "Method For Fabricating An Electrically Addressable Silicon-On-Sapphire Light Valve," which is a divisional of U.S. patent application Ser. No. 09/047,658 (Navy Case No. 79,029) filed Mar. 25, 1998, U.S. Pat. No. 6,312,968 entitled "Method For Fabricating An Electrically Addressable Silicon-On-Sapphire Light Valve," which is a continuation-in-part of U.S. patent application Ser. No. 08/301,170 (Navy Case No. 74,146) filed Sep. 1, 1994 (abandoned), entitled "Method For Fabricating An Electrically Addressable Silicon-On-Sapphire Light Valve," which is a continuation-in-part of U.S. patent application Ser. No. 08/105,252 (Navy Case No. 73,925) filed Aug. 4, 1993 (abandoned), entitled "Ultra-High Resolution Liquid Crystal Display On Silicon-On-Sapphire," which is a continuation-in-part of U.S. patent application Ser. No. 08/094,541 (Navy Case No. 73,899), filed Jun. 30, 1993, U.S. Pat. No. 5,300,443 entitled "Method For Fabricating Complementary Enhancement And Depletion Mode Field Effect Transistors On A Single Substrate." All six of these related applications are incorporated by reference herein.

FEDERALLY-SPONSORED RESEARCH AND DEVELOPMENT

The SILICON-ON-SAPPHIRE DISPLAY WITH WIRELESS INTERCONNECTIONS AND METHOD OF FABRICATING SAME is assigned to the United States Government and is available for licensing for commercial purposes. Licensing and technical inquiries should be directed to the Office of Patent Counsel, Space and Naval Warfare Systems Center, San Diego, Code 20012, San Diego, Calif., 92152; telephone (619)553-3001, facsimile (619)553-3821. Reference Navy Case No. 96,339.

BACKGROUND OF THE INVENTION

The Silicon-On-Sapphire Display With Wireless Interconnections and Method of Fabricating Same generally relates to silicon-on-sapphire liquid crystal displays, and more particularly, relates to silicon-on-sapphire liquid crystal displays with wireless interconnects.

Liquid crystal displays are used in a wide variety of commercial applications including portable (laptop) computers, wristwatches, camcorders and large screen televisions. Liquid crystal light valves, used as spatial light modulators, may be used in projection systems as well as optical computing applications. Limitations inherent in the existing technology come from the necessity of fabricating the displays on transparent glass or quartz substrates, which are not amenable to high quality electronic materials. Fabrication of displays on bulk silicon, although of high crystal quality, unnecessarily constrains the display to reflective mode schemes due to the opaque substrate and is not applicable to transmissive applications. The ability to integrate drive circuitry using thin-film transistors (TFTs) with liquid crystal displays has improved reliability and has allowed the use of this technology in lightweight, portable applications. However, the integration of display driving circuitry heretofore has been substantially limited to thin film transistor technology using amorphous (a-Si) or polycrystalline (p-Si) silicon deposited on the glass or quartz substrate. The intrinsic properties such as lattice and thermal mismatch between the silicon layer and the substrate, and the low temperature deposition techniques used in the a-Si and p-Si technologies result in a silicon layer with poor charge carrier mobility and crystallographic defects. These limitations are directly related to inferior electronic device performance and limitations when compared to bulk silicon.

Of particular importance for integrated display systems is the desire for higher density circuitry for ultra-high resolution display and light valve applications and for the monolithic integration of display driver circuitry and related signal processing circuitry on-chip. The characteristic lower (electrical and crystallographic) qualities of a-Si and p-Si materials result in poor fabrication yields when compared to conventional Very Large Scale Integration (VLSI) processing. Overcoming this problem, inherent in the poorer quality amorphous or polycrystalline material, requires the use of redundant circuit elements in each pixel to ensure fully functional displays in a-Si and p-Si. This redundancy requires a concomitant increase in the picture element (pixel) size thereby inhibiting the ability to scale displays and light valves to ultra-high resolution. The additional circuit elements also reduce the aperture ratio, i.e. the fraction of pixel area allowing transmitted light, thereby reducing the brightness of the display or light valve.

Furthermore, the low carrier mobility, low speed, low yield a-Si and p-Si materials are incompatible with VLSI design and fabrication techniques which would otherwise readily allow integration of video drivers, digital logic and other computational circuitry on-chip thereby offering designers greater functionality, higher reliability, and improved performance.

Thus, a need is recognized for a liquid crystal display or light valve system, which monolithically integrates an active matrix display with its associated drive and image processing circuitry.

SUMMARY OF THE INVENTION

In one aspect of the invention, a liquid crystal display includes: a) a sapphire substrate; b) a single crystal silicon structure disposed on the sapphire substrate to create a silicon-on-sapphire structure; c) a plurality of liquid crystal capacitors disposed on the silicon-on-sapphire structure; d) integrated self-aligned circuitry formed from the crystal silicon structure, where the circuitry modulates the liquid crystal capacitors in response to an input control signal; and e) a receiver disposed on the silicon-on-sapphire structure for receiving electromagnetic radiation and generating the input control signal responsive to the received electromagnetic radiation.

In another aspect of the invention, a method of fabricating a monolithically integrated crystal array display and control circuitry on a silicon-on-sapphire structure includes the steps of: (a) affixing a single crystal silicon structure to a sapphire substrate; (b) ion implanting the single crystal silicon structure with a species selected from the group consisting of: silicon ions, tin ions, germanium ions, and carbon ions to create an ion-implanted silicon layer; (c) annealing the silicon-on-sapphire structure; (d) oxidizing the ion-implanted silicon layer to form a silicon dioxide layer from a portion of the silicon layer so that a thinned, ion-implanted silicon layer remains; (e) removing the silicon dioxide layer to expose the thinned ion-implanted silicon layer; (f) fabricating transistors wherein each of the transistors is formed by patterning the thinned ion-implanted silicon layer to create a patterned silicon layer; (g) growing a gate oxide on the patterned silicon layer; (h) forming a polysilicon layer over the silicon-on-sapphire structure; (i) doping the polysilicon layer; (j) patterning the polysilicon layer and the gate oxide to form a gate region and to expose selected regions of the thinned, ion-implanted silicon layer; (k) ion-implanting the selected regions of the silicon layer to create source and drain regions in the silicon layer that are self-aligned with the gate region; (l) fabricating electrical contacts that are electrically connected to the transistors; (m) monolithically fabricating a receiver operably coupled to the transistors for receiving electromagnetic radiation; and (n) fabricating liquid crystal capacitors on the silicon-on-sapphire structure that are electrically connected to the transistors by the electrical contacts.

In yet another aspect of the invention, a liquid crystal display system includes: (a) a liquid crystal display, comprising: (i) a plurality of liquid crystal capacitors disposed on a first structure of silicon-on-sapphire; (ii) integrated self-aligned circuitry disposed on the first structure for modulating the liquid crystal capacitors responsive to an input control signal; and (iii) a receiver disposed on the first structure for receiving electromagnetic radiation and for generating the input control signal responsive to the received electromagnetic radiation; and (b) an off-chip circuit disposed on a second structure for generating the electromagnetic radiation.

DESCRIPTION OF SOME EMBODIMENTS

Figure 1A:
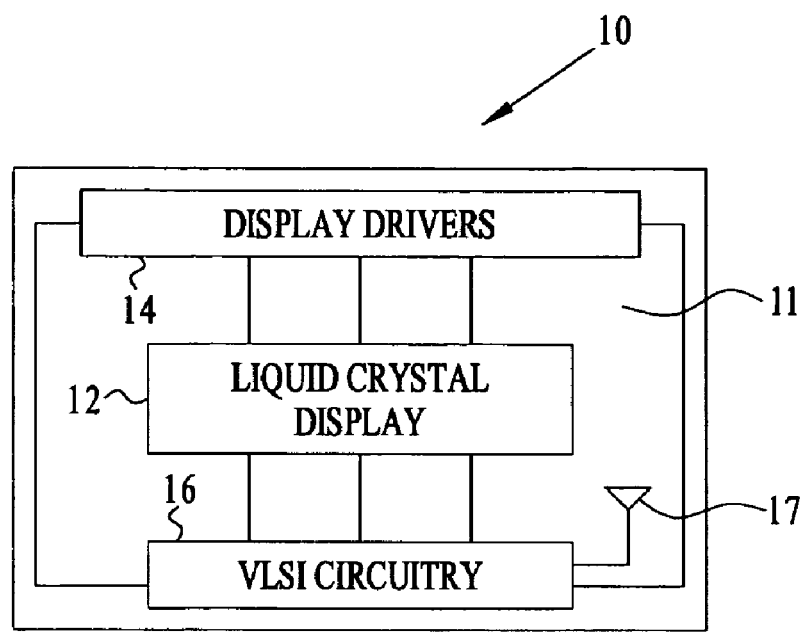
FIG. 1A is a block diagram showing a liquid crystal display monolithically integrated with associated circuitry and wireless interconnections on an improved ultra-thin silicon-on-sapphire (UTSOS) wafer, in accordance with the Silicon-On-Sapphire Display With Wireless Interconnections and Method of Fabricating Same.

FIG. 1A shows a SOS display with wireless interconnections 10. Display 10 includes nematic liquid crystal display 12, display drivers 14, very large scale integration (VLSI) circuitry 16, and antenna 17 monolithically integrated on an improved ultra-thin silicon-on-sapphire (UTSOS) wafer 11.

Liquid crystal display 12 includes an array of one or more pixel elements, which may be individually addressed so that display 12 presents an image for viewing or projection. By way of example, a 1000 pixel×1000 pixel display may be incorporated into display 12, but it is recognized that any number of pixel elements may be utilized as may be necessary to suit the needs of a particular application.

Figure 2:
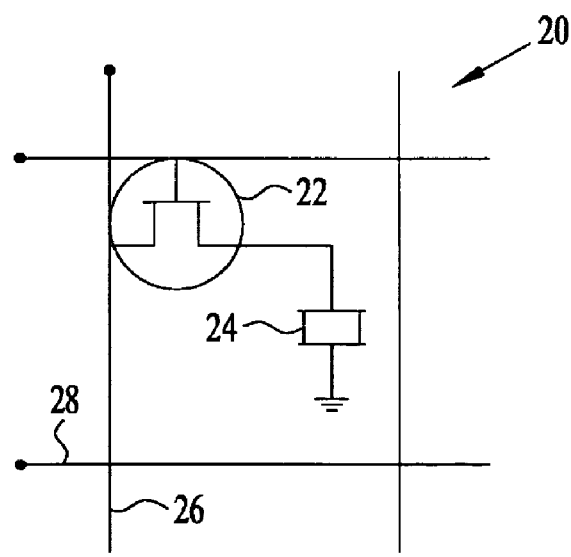
FIG. 2 is a schematic showing a single picture element (pixel), in accordance with the Silicon-On-Sapphire Display With Wireless Interconnections and Method of Fabricating Same.

Display drivers 14 and VLSI circuitry 16 are used to address each of a plurality of individual pixel elements 20 (as shown in FIG. 2) and to generate the appropriate voltages to modulate the liquid crystal capacitors 24 such that a desired image is presented by liquid crystal display 12. These modulation voltages are generated in response to an input control signal that is generated by a receiver. Typically, display drivers 14 include shift registers and clock circuitry. VLSI circuitry 16 may include image processing circuits, memory and buffer circuits, and receiver circuitry.

Referring back to FIG. 1A, Display 10 further includes a receiver formed on the sapphire substrate to receive electromagnetic radiation. By way of example, this receiver is incorporated into VLSI circuitry 16 and is coupled to antenna 17. Antenna 17 may be selected from the group of antenna elements well known in the art including, but not limited to, patch antennas, leaky-wave antennas, planar-Yagi antennas, or dipole antennas. The receiver generates an input control signal responsive to received electromagnetic radiation, which may represent information such as, video signal, power on/off, liquid crystal capacitor 24 modulation, and wireless communication protocol information.

In addition or as an alternative embodiment, Display 10 may include a transmitter for generating electromagnetic radiation in response to an output control signal. This transmitter may be integrated into VLSI circuitry 16 and may be coupled to antenna 17. VLSI circuitry may also include circuitry to generate the output control signal. The output control signal may represent information such as, display output light intensity, ambient light intensity, video sync, power status, and wireless communication protocol information.

Figure 1B:
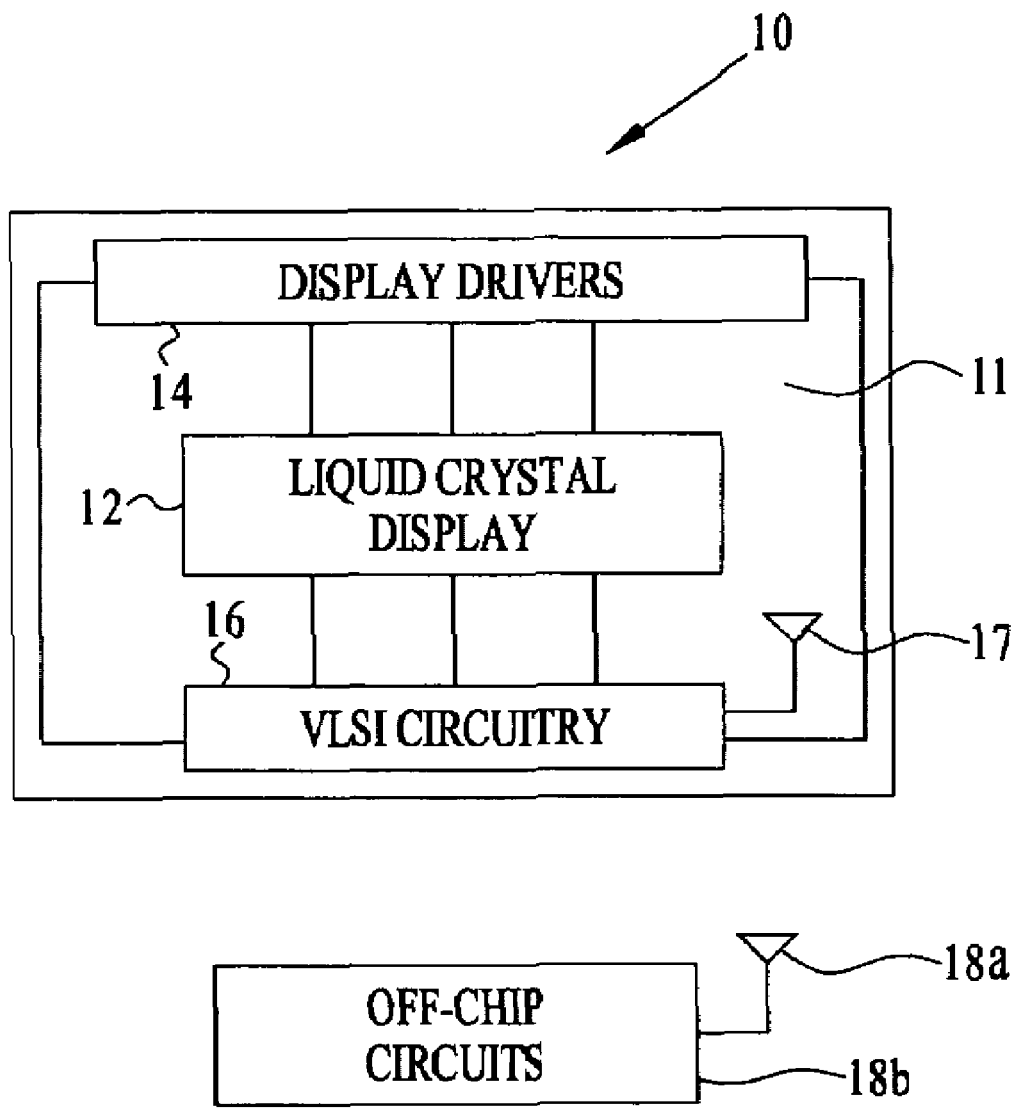
FIG. 1B is a block diagram showing a liquid crystal display system, in accordance with the Silicon-On-Sapphire Display With Wireless Interconnections and Method of Fabricating Same.

FIG. 1B shows a liquid crystal display system that includes SOS display with wireless interconnections 10 and Off-chip circuits 18b. Off-chip circuits are disposed on a separate structure than display 10 and these structures may, for example, be electrically isolated from one another. Display 10 includes nematic liquid crystal display 12, display drivers 14, very large scale integration (VLSI) circuitry 16, and antenna 17 monolithically integrated on an improved ultra-thin silicon-on-sapphire (UTSOS) wafer 11. Off-chip circuits 18b may include wireless communications circuitry and antenna 18a.

Liquid crystal display 12 includes an array of one or more pixel elements, which may be individually addressed so that display 12 presents an image for viewing or projection. By way of example, a 1000 pixel×1000 pixel display may be incorporated into display 12, but it is recognized that any number of pixel elements may be utilized as may be necessary to suit the needs of a particular application.

Display drivers 14 and VLSI circuitry 16 are used to address each of a plurality of individual pixel elements 20 (as shown in FIG. 2) and to generate the appropriate voltages to modulate the liquid crystal capacitors 24 such that a desired image is presented by liquid crystal display 12. These modulation voltages are generated in response to an input control signal that is generated by a receiver. Typically, display drivers 14 include shift registers and clock circuitry. VLSI circuitry 16 may include image processing circuits, memory and buffer circuits, and receiver circuitry.

Referring back to FIG. 1B, off-chip circuits 18b transmits electromagnetic radiation, which is received by a receiver formed on the sapphire substrate of display 10. By way of example, this receiver is incorporated into VLSI circuitry 16 and is coupled to antenna 17. Antenna 17 may be selected from the group of antenna elements well-known in the art including, but not limited to, patch antennas, leaky-wave antennas, planar-Yagi antennas, or dipole antennas. The receiver generates an input control signal responsive to the received electromagnetic radiation, which may represent information such as, video signal, power on/off, liquid crystal capacitor 24 modulation, and wireless communication protocol information.

In addition or as an alternative embodiment, Display 10 may include a transmitter for transmitting electromagnetic radiation to off-chip circuits 18b responsive to an output control signal. This transmitter may be integrated into VLSI circuitry 16 and may be coupled to antenna 17. VLSI circuitry may also include circuitry to generate the output control signal. The output control signal may represent information such as, display output light intensity, ambient light intensity, video sync, power status, and wireless communication protocol information.

Figure 10:
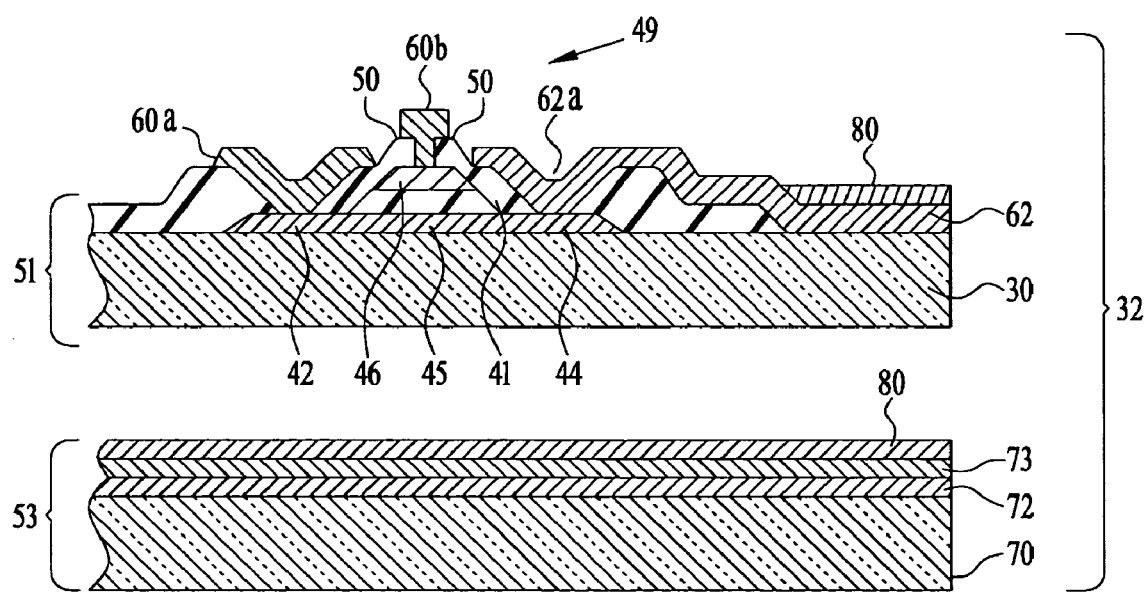
Figure 11:
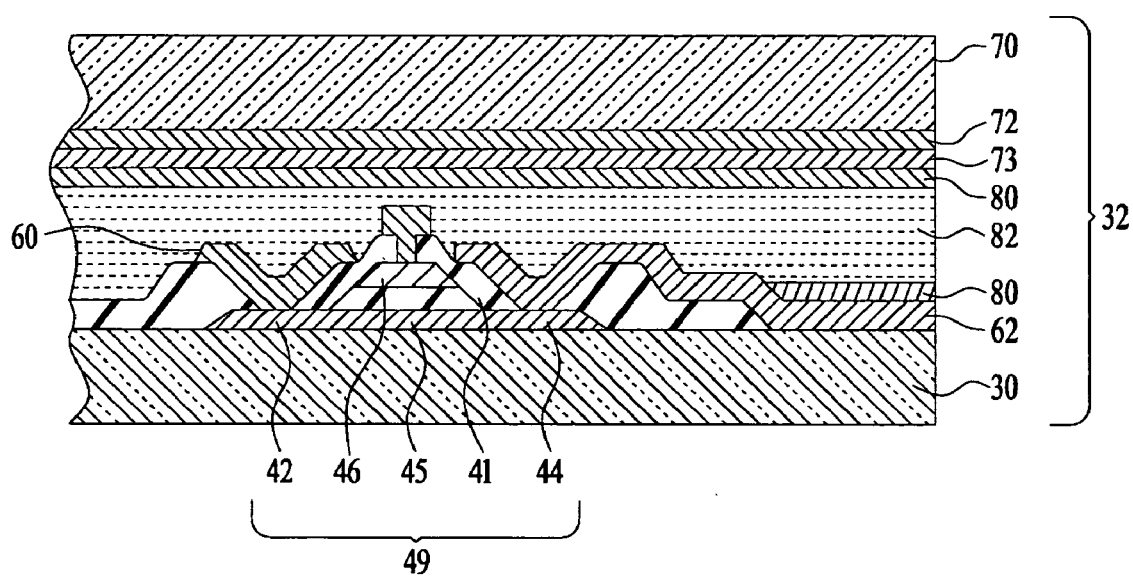
Figure 12:
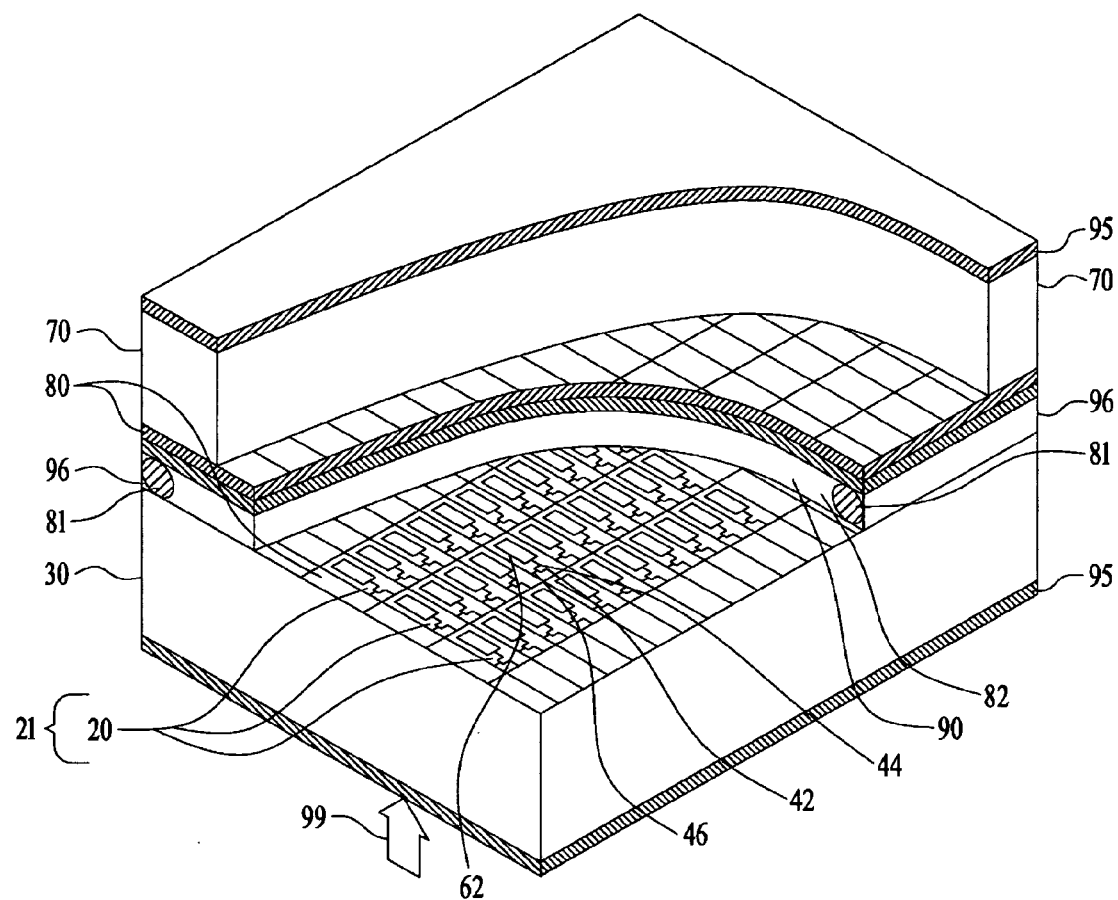
Figure 13:
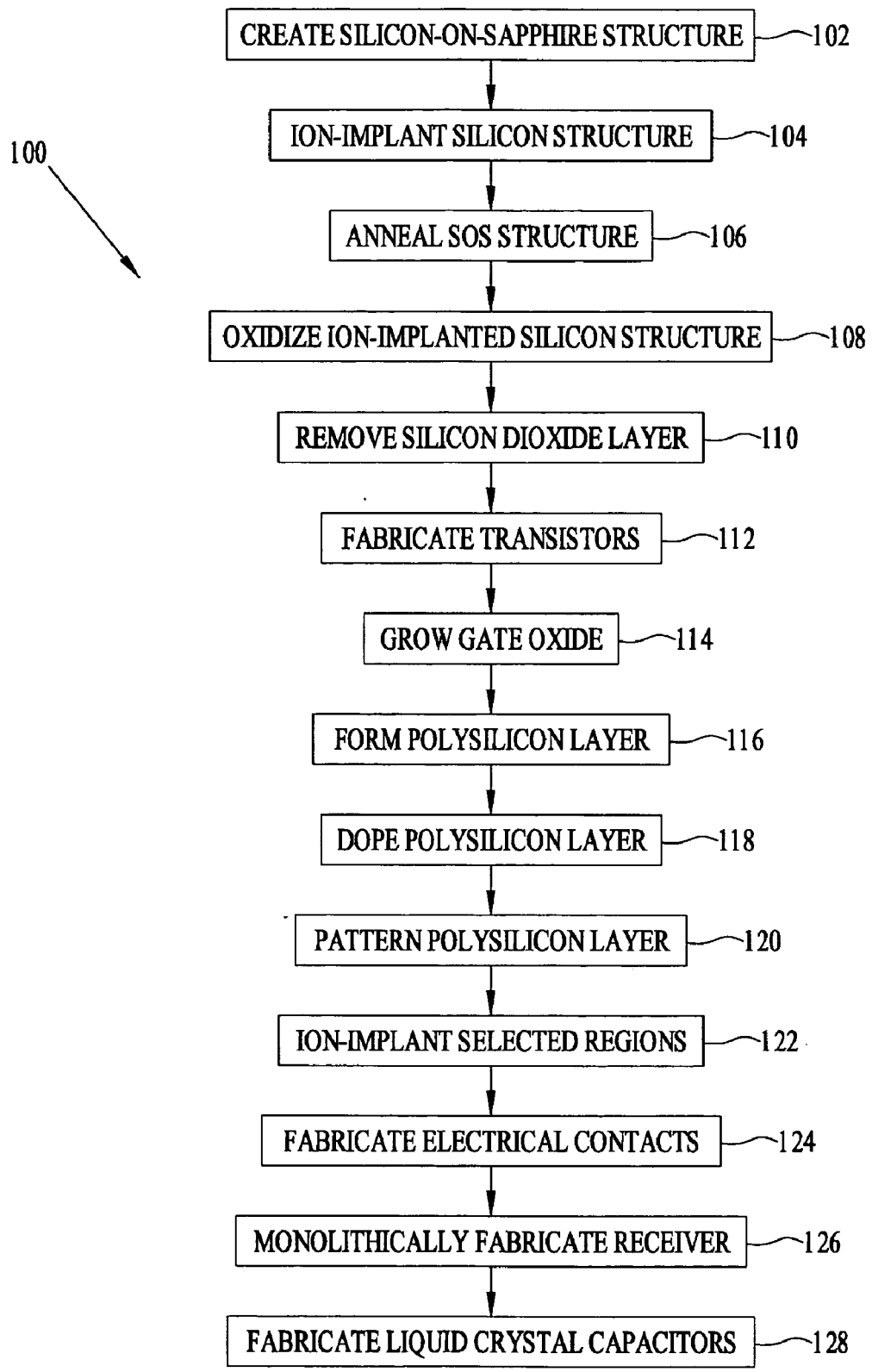
FIG. 13 is a flow-chart showing an integrated fabrication process, in accordance with the Silicon-On-Sapphire Display With Wireless Interconnections and Method of Fabricating Same.

For purposes of illustrating the self-aligned manufacture of the SOS display with wireless interconnections 10 of both FIGS. 1A and 1B, fabrication of only the simplest pixel element is described. Each pixel element includes a single nonlinear circuit element (self-aligned transistor) and a single nematic liquid crystal capacitor. As detailed below, a plurality or multitude of such pixels may be configured and interconnected in an array with drive and image processing circuitry using standard photolithographic processes. FIG. 2 shows an electrical schematic for a single liquid crystal display element 20, which includes a nonlinear circuit element 22, such as a MOSFET, and a single nematic liquid crystal capacitor 24. Metal column line 26 and polysilicide row line 28 are appropriately connected to bias the nonlinear circuit element 22 to vary the voltage of the nematic liquid crystal 24 to achieve a desired gray scale. FIGS. 10, 11, and 12 show the steps for fabricating a single liquid crystal display element 20 and non-linear circuit element 22.

Figure 3:
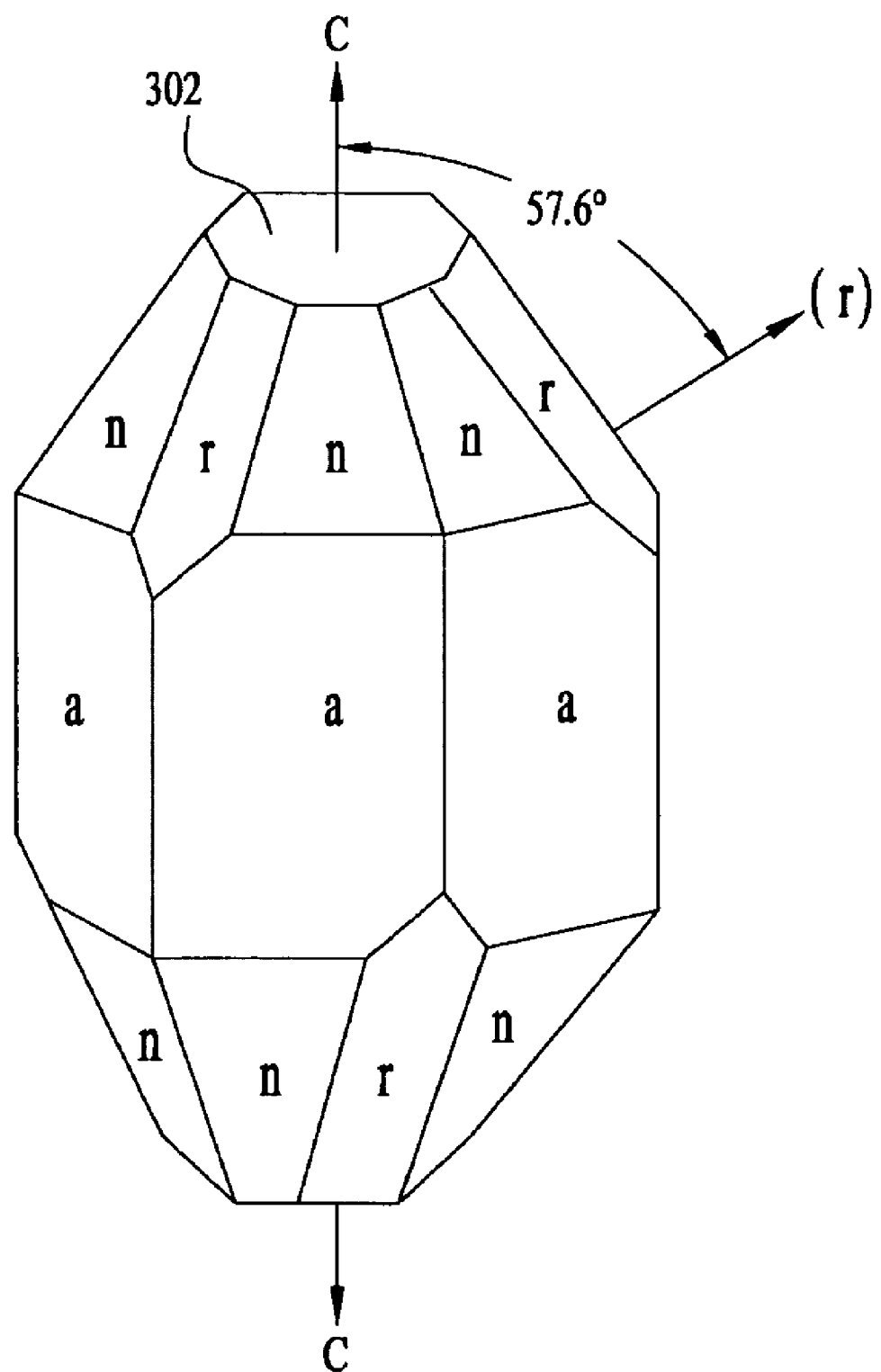
FIG. 3 is an illustration showing the crystal structure of sapphire, in accordance with the Silicon-On-Sapphire Display With Wireless Interconnections and Method of Fabricating Same.
Figure 4:
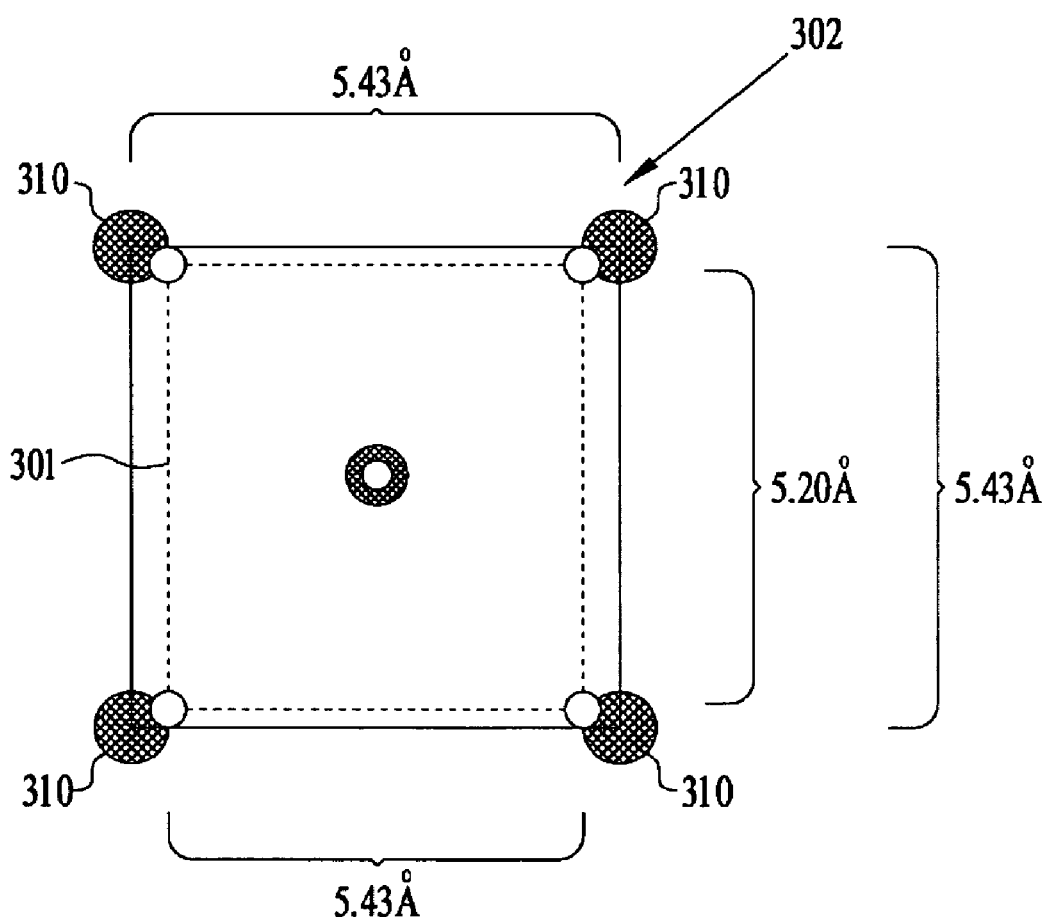
FIG. 4 is a view showing a silicon crystal formed on the r-plane of the sapphire crystal shown in FIG. 3.
Figure 5:
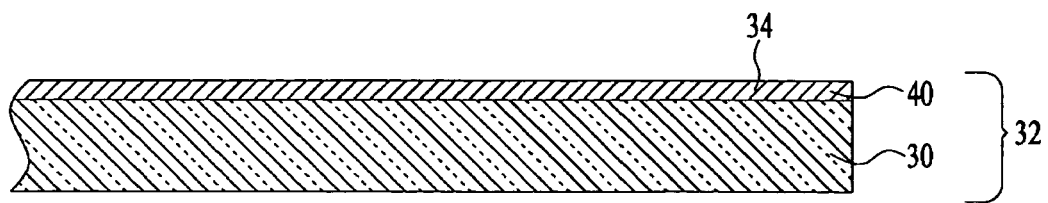
FIGS. 5–12 are cross-sectional illustrations showing a liquid crystal display and associated self-aligned circuitry through the integrated fabrication process, in accordance with the Silicon-On-Sapphire Display With Wireless Interconnections and Method of Fabricating Same.

Referring to FIG. 5, a single crystal silicon layer 40 is affixed to a sapphire ($Al_2O_3$) substrate 30 to create a silicon-on-sapphire (SOS) wafer 32, where wafer 32 represents the various manufactured stages of the structure being fabricated into liquid crystal display 20. One method for affixing silicon layer 40 to sapphire substrate 30 is by epitaxial deposition of a single crystal layer of silicon onto sapphire substrate 30. Epitaxial deposition of single crystal silicon layer 40 is achieved by thermal decomposition of silane onto sapphire substrate 30 in accordance with well known techniques. As shown in FIG. 3, a sapphire crystal has a rhombohedral structure with hexagonal symmetry along the c-axis. Due to the hexagonal symmetry, the sapphire crystal is often described using hexagonal coordinates rather than the standard crystallographic Miller indices. Thus, the c-axis of sapphire is written as (0001). The crystalline structure of silicon and sapphire are not the same, therefore hetero-epitaxy of silicon on sapphire is not inherently plausible due to substantial crystalline, lattice and thermal expansion coefficient mismatch. However, thin films of single-crystal silicon have been fabricated on certain sapphire crystal planes that have a compatible, although not identical, crystal structure. Compatible crystal structures refer to a single crystal of a first material such as silicon that is capable of being formed on a single crystal of a second material such as sapphire. The r-plane of sapphire crystal and denoted by ($1\bar{1}02$) is one type of crystal structure on which single crystal silicon may be grown. FIG. 4 schematically shows a top view of a (100)-oriented silicon layer 301 formed on a r-plane sapphire crystall 300. The silicon layer 301 has a lattice spacing of 5.43 Å that includes silicon atoms 310. The relative lattice spacing of r-plane sapphire crystal 300, containing aluminum atoms 310 shows a lattice spacing of 4.75 Å along the ($11\bar{2}0$)direction and 5.20 Å along the ($\bar{1}101$) direction. Therefore, there is a lattice mismatch of 4.2% along the ($\bar{1}101$) direction and a lattice mismatch of 12.5% along the ($\bar{1}120$) direction. This lattice mismatch and the thermal expansion mismatch between sapphire crystal 300 and silicon crystal 301 lead to crystalline defects (twins and dislocations) in silicon layer 40 that detrimentally effect electronic device performance. The concentration of defects is much higher near the silicon/sapphire interface 34 and decreases in a direction into silicon layer 40, away from the silicon/sapphire interface 34. Thus, it is important to improve the quality of the silicon layer 40 in order to eliminate all or most of the defects in order to obtain a single crystal silicon layer or structure having optimized properties such as a low concentration of twin defects, threading dislocations, high charge carrier mobility, and longer carrier lifetime. An example of a process for improving the quality of the silicon layer 40 is known as solid phase epitaxial regrowth. Alternatively, single crystal silicon layer 40 may be made from a single crystal silicon structure that is bonded to sapphire substrate 30, as described in commonly assigned U.S. Pat. No. 5,441,591, incorporated herein by reference.

Silicon layer 40 then is ion implanted with $^{28}Si$ atoms (doses on the order of $10^{14}$ $cm^{-2}$ at 185 keV) into the near interfacial region of the silicon-sapphire interface 34 while the temperature of wafer 32 is maintained at −20 degrees C. Ion implanting other isotopes species of silicon such as $^{29}Si$ and $^{30}Si$ may also be employed in the practice of the present invention. Species of substantially different masses such as ions or complexes of tin (Sn), germanium (Ge) or carbon (C) may also be used by appropriately varying the implant parameters.

Still referring to FIG. 5, after being ion-implanted, silicon layer 40, ergo wafer 32, is thermally soaked for about 30 minutes at 550° C., where after the temperature is ramped upwardly over the course of an hour from 550° C. to 900° C. Next, silicon layer 40 is thermally annealed at 900° C. in nitrogen for approximately one hour. A gradual anneal of silicon layer 40 allows the silicon layer 40 to regrow as a single crystal having minimal defects, and avoids subjecting the silicon layer 40 to thermal shock. Then silicon layer 40 is oxidized at 1000° C. in order for a portion of silicon layer 40 to transform into oxide. The oxide is subsequently etched to reduce the thickness of silicon layer 40. The oxidation and etch process of silicon layer 40 may be repeated as required until silicon layer 40 has a thickness generally in the range of about 30 to less than 100 nm. The thinned, single crystal silicon layer 40 offers substantial improvement in absorption (i.e. increased brightness), resistance to heating, and parasitic photoexcited carriers compared to such properties of thicker silicon structures.

Figure 6:
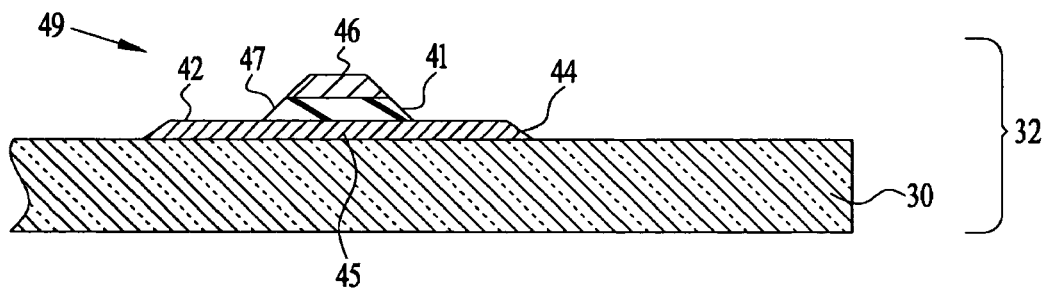

Referring next to FIG. 6, the single nonlinear circuit element 22, such as a MOSFET, is fabricated on the thinned and patterned silicon layer 40 using well known photolithographic techniques to create the self-aligned MOSFET structure 49. MOSFET structure 49 includes gate oxide 41, source region 42, drain region 44, channel region 45, gate electrode 46 and sidewall oxide 47, where source region 42, drain region 44, and channel region 45 are formed from patterned single crystal silicon layer 40. Source region 42 and drain region 44 are formed following the formation of gate electrode 46, and are therefore said to be self-aligned to the gate thereby reducing parasitic capacitance and improving the performance of the device and circuitry formed from such devices.

Figure 7:
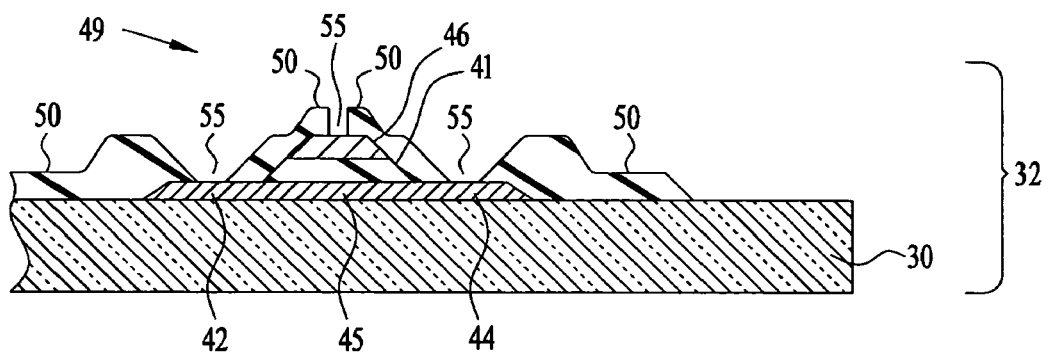

Referring to FIG. 7, the fabrication of pixel element 20, and particularly that of MOSFET structure 49 on wafer 32, continues by chemical vapor deposition (CVD) and selective etching of passivation oxide layer 50 onto wafer 32. After formation of passivation oxide layer 50, contact holes 55 are patterned in passivation oxide layer 50 to expose selected areas of source region 42, drain region 44 and gate region (via gate electrode 46).

Figure 8:
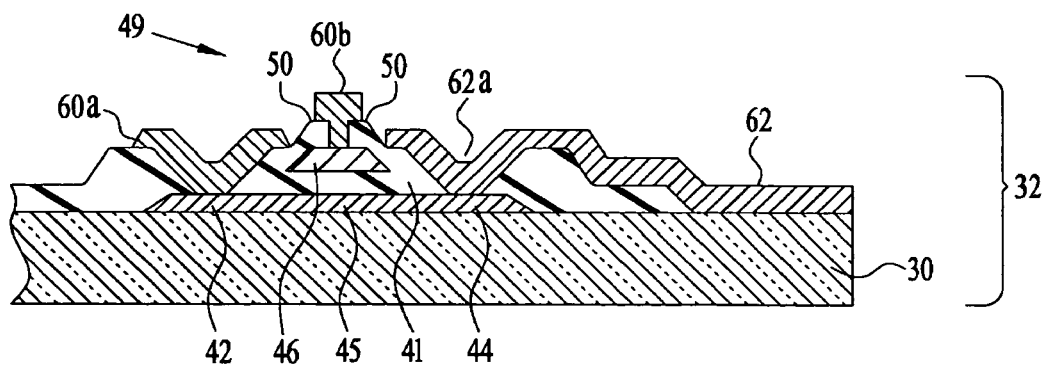

As shown in FIG. 8, depositing and patterning interconnect metallization layer 62 onto wafer 32 to create contacts 60a, 60b, and 62a to source region 42, gate electrode 46, and drain region 44, respectively to provide wafer 32 with the structure. The interconnect metallization layer 62 may be fabricated using a multiple step process. For example, an aluminum alloy (99% Al: 1% Si) may be deposited and patterned for all contacts including source contact 60a, gate contact 60b, and interconnections with silicon MOSFETs and related devices and circuits. A transparent conductive material such as indium tin oxide (ITO) may be subsequently deposited and patterned as a transparent drain contact 62a that also extends as a transparent nematic liquid crystal capacitor contact or electrode 62 for a nematic liquid crystal capacitor to be described, (the interconnect metallization also forms the output electrode from the MOSFET to pixel electrode 62). The transparent nematic liquid crystal capacitor electrode 62 may be employed when the display system 10 is used in a transmissive mode. However, for a reflective mode display or light-valve system, the nematic liquid crystal capacitor electrode may be an opaque metal (such as Al or 99% Al:1% Si) as this forms a back reflector for the system.

Figure 9:
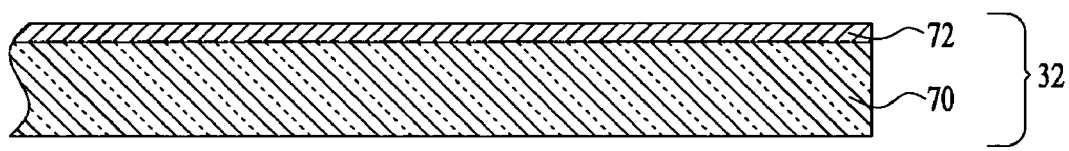

At this stage of the process, the monolithically integrated self-aligned circuitry, display drivers 14 and VLSI circuitry 16, including the non-linear circuit element 22 within the each pixel 20 are completely fabricated and may, if desired, be covered with additional passivation, shielding or planarization layers useful in certain applications. For example, such passivation may be desired in order to protect devices for subsequent processing of the wafer to provide a region on the sapphire substrate 30 for formation of the receiver circuitry and antenna 17. The process for forming the receiver and antenna includes patterning the desired areas on the wafer for the antenna and electrical interconnections to the VLSI circuitry and display drivers, stripping the layers formed within the desired areas on the wafer to reveal the sapphire substrate, forming contact holes for the antenna and electrical interconnections, and depositing and patterning a conductive layer on the sapphire to form the antenna and the interconnections using techniques described above. For example, as shown in FIG. 9, a transparent substrate 70, e.g. sapphire, quartz, fused silica or glass, may be covered with a transparent metallized counter electrode 72, and appropriately patterned. Counter electrode 72 is normally common for the entire array of pixels 20 of crystal display 12.

Referring to FIG. 10, wafer structure 32 now includes wafer subassemblies 51 and 53. Pixel 20 may be fabricated to provide a colored display by attachment of a suitably colored optical filter layer 73 to counter electrode 72. Next, alignment layer 80 then may be formed on filter layer 73 to pin one end of liquid crystal 82 to surface of alignment layer 80 to allow uniform rotation of the liquid crystal 82 when subjected to a voltage bias, therefore uniformly affecting the retardation of the polarized light that is transmitted through the liquid crystal capacitor 24. Formation of alignment layer 80 may be achieved by depositing a thin polyimide layer 80 on, inter alia, optical filter layer 73 and pixel electrode 62, which is subsequently mechanically rubbed to obtain a preferred orientation for the liquid crystal media.

A method for spacing each pixel electrode 62 from counter electrode 72 employs fiber glass spacer rods or beads 81 (FIG. 12) to form a cavity between structures 51 and 53 shown in FIG. 10. Spacer rods 81 normally lie at the periphery of wafer 32. Referring to FIGS. 11 and 12, final assembly of liquid crystal display 10 requires appropriately aligning and positioning substrate 30 with respect to substrate 70 so as to form a cavity 82 which is filled with a desired liquid crystal material 90 such as a nematic liquid crystal material or a ferroelectric crystal material. Cavity 82 is then hermetically sealed or plugged with flat closures 96.

Referring still to FIG. 12, affixing appropriately oriented polarizers 95 to transparent substrate 70 completes the fabrication of the liquid crystal display 10, which includes pixel elements 20 arranged in an array.

The circuit architecture described above is suitable for driving bistable ferroelectric liquid crystal (FLC) materials or nematic liquid crystals that have the requirement for stringent, low leakage in SOS circuits. In all embodiments, self-aligned circuitry is employed to reduce parasitic capacitances, thereby improving the performance and ease of fabrication of the display apparatus. The liquid crystal display may be formed on silicon-on-insulator, of which silicon-on-sapphire is an example.

We claim:

1. A liquid crystal display, comprising:
   a sapphire substrate having a first crystal lattice structure;
   a single crystal silicon structure disposed on said sapphire substrate to create a silicon-on-sapphire structure,
   wherein said crystal silicon structure has a thickness no greater than about 100 nanometers; and
   wherein said crystal silicon structure has a second crystal lattice structure oriented by said first crystal lattice structure;
   a plurality of liquid crystal capacitors disposed on said silicon-on-sapphire structure;
   integrated self-aligned circuitry formed from said crystal silicon structure for modulating said liquid crystal capacitors responsive to an input control signal; and
   a receiver disposed on said silicon-on-sapphire structure for receiving electromagnetic radiation and for generating said input control signal responsive to said received electromagnetic radiation.

2. The liquid crystal display of claim 1 wherein said receiver further comprises an antenna disposed on said sapphire structure.

3. The liquid crystal display of claim 2 wherein said receiver further comprises integrated control circuitry coupled to said antenna for generating said input control signal.

4. The liquid crystal display of claim 1 wherein said input control signal comprises information selected from the group consisting of: video, capacitor modulation, power on/off, and communication protocol information.

5. The liquid crystal display of claim 1 further comprising a transmitter for generating electromagnetic radiation responsive to an output control signal.

6. The liquid crystal display of claim 5 wherein said transmitter further comprises an antenna disposed on said sapphire structure.

7. The liquid crystal display of claim 6 wherein said transmitter further comprises integrated control circuitry coupled to said antenna for generating said output control signal.

8. The liquid crystal display of claim 5 wherein said output control signal comprises information selected from the group consisting of: output light intensity, ambient light intensity, video sync, power status, and communication protocol information.

9. The liquid crystal display of claim 1 wherein said sapphire substrate has an r-plane orientation and said single crystal silicon structure has a (100)-orientation.

10. The liquid crystal display of claim 1 wherein each of said liquid crystal capacitors is coupled to a transistor disposed on said silicon-on-sapphire structure.

11. The liquid crystal display of claim 1 wherein said liquid crystal capacitor provides a reflective pixel element.

12. The liquid crystal display of claim 1 wherein said liquid crystal capacitor provides a pixel element that is transmissible to light.

13. A method of fabricating a monolithically integrated crystal array display and control circuitry on a silicon-on-sapphire structure, comprising the steps of:
   (a) affixing a single crystal silicon structure to a sapphire substrate having a first crystal lattice structure to create a silicon-on-sapphire structure, wherein said crystal silicon structure has a thickness no greater than about 100 nanometers and a second crystal lattice structure oriented by said first crystal lattice structure;
   (b) ion implanting said single crystal silicon structure with a species selected from the group consisting of: silicon ions, tin ions, germanium ions, and carbon ions to create an ion-implanted silicon layer;
   (c) annealing said silicon-on-sapphire structure;
   (d) oxidizing said ion-implanted silicon layer to form a silicon dioxide layer from a portion of said silicon layer so that a thinned, ion-implanted silicon layer remains;
   (e) removing said silicon dioxide layer to expose said thinned ion-implanted silicon layer;
   (f) fabricating transistors wherein each of said transistors is formed by patterning said thinned ion-implanted silicon layer to create a patterned silicon layer;
   (g) growing a gate oxide on said patterned silicon layer;
   (h) forming a polysilicon layer over said silicon-on-sapphire structure;
   (i) doping said polysilicon layer;
   (j) patterning said polysilicon layer and said gate oxide to form a gate region and to expose selected regions of said thinned, ion-implanted silicon layer;
   (k) ion-implanting said selected regions of said silicon layer to create source and drain regions in said silicon layer that are self-aligned with said gate region;
   (l) fabricating electrical contacts that are electrically connected to said transistors;
   (m) monolithically fabricating a receiver operably coupled to said transistors for receiving electromagnetic radiation; and
   (n) fabricating liquid crystal capacitors on said silicon-on-sapphire structure that are electrically connected to said transistors by said electrical contacts.

14. The method of claim 13 wherein said sapphire substrate has an r-plane orientation and said single crystal silicon structure has a (100)-orientation.

15. A liquid crystal display system, comprising:
   a liquid crystal display, comprising:
   a plurality of liquid crystal capacitors disposed on a first structure of silicon-on-sapphire;
   integrated self-aligned circuitry disposed on said first structure for modulating said liquid crystal capacitors responsive to an input control signal; and
   a receiver disposed on said first structure for receiving electromagnetic radiation and for generating said input control signal responsive to said received electromagnetic radiation; and
   an off-chip circuit disposed on a second structure for generating said electromagnetic radiation.

16. The liquid crystal display system of claim 15 wherein said first structure comprises a single crystal silicon structure disposed on a sapphire substrate having a first crystal lattice structure, wherein said crystal silicon structure has a thickness no greater than about 100 nanometers and a second crystal lattice structure oriented by said first crystal lattice structure.

17. The liquid crystal display system of claim 15 wherein said receiver comprises an antenna disposed on said first structure.

18. The liquid crystal display system of claim 15 wherein said liquid crystal display further comprises a transmitter for transmitting electromagnetic radiation to said off-chip circuitry responsive to an output control signal.

19. The liquid crystal display system of claim 18 wherein said output control signal comprises information selected from the group consisting of: output light intensity, ambient light intensity, video sync, power status, and communication protocol information.

20. The liquid crystal display system of claim 15 wherein said input control signal comprises information selected from the group consisting of: video, capacitor modulation, power on/off, and communication protocol information.

* * * * *